United States Patent
Miyauchi et al.

(10) Patent No.: US 9,061,904 B2
(45) Date of Patent: Jun. 23, 2015

(54) CELLULOSE SHEATHED NANOTUBE FIBER

(75) Inventors: Minoru Miyauchi, Guilderland, NY (US); Jianjun Miao, Troy, NY (US); Trevor J. Simmons, Rhineback, NY (US); Jong-Won Lee, Watervliet, NY (US); Thomas V. Doherty, Latham, NY (US); Jonathan S. Dordick, Schenectady, NY (US); Robert J. Linhardt, Albany, NY (US)

(73) Assignee: Rennsselaer Polytechnic Institute, Troy, NY (US)

( * ) Notice: Subject to any disclaimer, the term of this patent is extended or adjusted under 35 U.S.C. 154(b) by 956 days.

(21) Appl. No.: 13/157,758

(22) Filed: Jun. 10, 2011

(65) Prior Publication Data
US 2011/0305903 A1    Dec. 15, 2011

Related U.S. Application Data

(60) Provisional application No. 61/397,454, filed on Jun. 11, 2010.

(51) Int. Cl.
*B23B 9/04* (2006.01)
*B29C 47/04* (2006.01)
(Continued)

(52) U.S. Cl.
CPC ............ *B82Y 30/00* (2013.01); *Y10T 428/2918* (2015.01); *D01D 5/0007* (2013.01);
(Continued)

(58) Field of Classification Search
CPC ............ B82Y 30/00; D01F 1/09; D01F 8/02; H01G 11/36; Y10T 428/24041; Y10T 428/24124; Y10T 428/24355; Y10T 428/24364; Y10T 428/29; Y10T 428/2913; Y10T 428/2915; Y10T 428/2929; Y10T 428/2933; Y10T 428/2938; Y10T 428/2964; Y10T 428/2965; Y10T 428/2973; Y10T 428/2975; Y10T 428/2976; Y10T 428/2978; Y10T 428/2918
USPC ........ 428/98, 103, 105, 113, 195.1, 196, 221, 428/292.1, 357, 364, 367, 373, 375, 376, 428/378, 392, 393, 397, 399, 400, 401, 403, 428/903; 442/59, 60, 110, 117, 165, 190; 977/742–753, 831, 842; 264/465
See application file for complete search history.

(56) References Cited

U.S. PATENT DOCUMENTS

2002/0113335 A1    8/2002    Lobovsky et al.
2009/0078640 A1    3/2009    Chu et al.

FOREIGN PATENT DOCUMENTS

KR    20090087700 A    8/2009

OTHER PUBLICATIONS

Li, Ling; The ionic liquid-associated synthesis of a cellulose/SWCNT complex and its remarkable biocompatibility, J. Mater. Chem., 2009,19, 3612-3617, Apr. 20, 2009.*
(Continued)

*Primary Examiner* — Jennifer Chriss
*Assistant Examiner* — Frank Vineis
(74) *Attorney, Agent, or Firm* — Hoffman Warnick LLC

(57) ABSTRACT

Embodiments of the invention provide a cellulose-sheathed carbon nanotube fiber. One aspect of the invention provides a sheathed nanotube fiber comprising: a carbon nanotube fiber; and a cellulose sheath extending co-axially along at least a first portion of a length of the carbon nanotube fiber. Another aspect of the invention provides a method of forming a sheathed carbon nanotube fiber, the method comprising: co-electrospinning a carbon nanotube fiber gel core within a cellulose solution sheath.

13 Claims, 3 Drawing Sheets

(51) Int. Cl.
| | |
|---|---|
| D02G 3/00 | (2006.01) |
| B82Y 30/00 | (2011.01) |
| D01D 5/00 | (2006.01) |
| D01F 1/09 | (2006.01) |
| D01F 8/02 | (2006.01) |
| H01G 9/02 | (2006.01) |
| H01G 11/52 | (2013.01) |

(52) U.S. Cl.
CPC . D01F 1/09 (2013.01); D01F 8/02 (2013.01); H01G 9/02 (2013.01); H01G 11/52 (2013.01); Y02E 60/13 (2013.01)

(56) References Cited

OTHER PUBLICATIONS

Klingeler R., Carbon nanotube based biomedical agents for heating, temperature sensoring and drug delivery, Int J Hyperthermia, Sep. 2008, 24(6), 496-505.*

Subrammanian, A., Development of biomaterial scaffold for nerve tissue engineering: Biomaterial mediated neural regeneration, J Biomed Sci. 2009; 16(1): 108, Nov. 25, 2009.*

Patent Cooperation Treaty, Notification Notification Concerning Transmittal of International Preliminary Report on Patentability for International Application PCT/IB2011/001401 dated Dec. 14, 2012, 6 pages.

Li et al., "Electrospinning of Nanofibers: Reinventing the Wheel?", Jul. 2004, pp. 1151-1170, Advanced Materials, vol. 16, No. 14.

Xu et al., "Electrospinning of Native Cellulose from Nonvolatile Solvent System", Apr. 2008, pp. 2911-2917, Polymer, Elsevier Ltd.

Sun et al., "Compound Core-Shell Polymer Nanofibers by Co-Electrospinning", Nov. 2003, pp. 1929-1932, Advanced Materials, vol. 15, No. 22.

Yu et al., "Production of Submicrometer Diameter Fibers by Two-Fluid Electrospinning", Sep. 2004, pp. 1562-1566, Advanced Materials, vol. 16, No. 17.

Viswanathan et al., "Preparation of Biopolymer Fibers by Electrospinning from Room Temperatures Ionic Liquids," Jan. 2006, pp. 415-418, American Chemical Society, Biomacromolecules, vol. 7.

Patent Cooperation Treaty, Notification of Transmittal of The International Search Report and The Written Opinion of the International Searching Authority, or The Declaration for International Application PCT/IB2011/001401 dated Apr. 4, 2012, 9 pages.

* cited by examiner

CELLULOSE SHEATHED NANOTUBE FIBER

CROSS-REFERENCE TO RELATED APPLICATIONS

This application claims the benefit of U.S. Provisional Patent Application No. 61/397,454, filed 11 Jun. 2010, which is hereby incorporated herein.

TECHNICAL FIELD

Embodiments of the invention relate generally to conductive cable fibers and, more particularly, to conductive cable fibers with an insulating surface prepared by co-axial electrospinning of multi-walled nanotubes and cellulose.

BACKGROUND OF THE INVENTION

Carbon nanotubes (CNTs) have attracted significant interest for a wide variety of potential applications due to their strength, flexibility, and high electrical and thermal conductivities. The electrical properties of a polymer matrix have been enhanced by using shear mixing to introduce a very low loading of CNTs. However, the strong van der Waals interactions between CNTs make it difficult to achieve high CNT loadings, good dispersion, or alignment within polymer matrices. Therefore, the preparation of structured CNT nanocomposites with desirable electrical, thermal, and strength properties remains challenging.

Electrospinning is a method of extruding fibers at high speed from a solution using electrostatic charging and has been used to prepare various types of hybrid nanofibers by incorporating nanomaterials into polymer solutions. It has been demonstrated that fibers can still be extracted from materials that normally cannot be electrospun through co-electrospinning, using a double needle spinneret.

SUMMARY OF THE INVENTION

Embodiments of the invention provide a cellulose-sheathed carbon nanotube fiber.

One aspect of the invention provides a sheathed nanotube fiber comprising: a carbon nanotube fiber; and a cellulose sheath extending co-axially along at least a first portion of a length of the carbon nanotube fiber.

Another aspect of the invention provides a method of forming a sheathed carbon nanotube fiber, the method comprising: co-electrospinning a carbon nanotube fiber gel core within a cellulose solution sheath.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Embodiments of the present invention provide co-axial core-sheath nanofibers with multi-wall carbon nanotubes (MWNTs) cores and cellulose sheaths. In some embodiments, such nanofibers may be produced using dry jet wet electrospinning using room temperature ionic liquid solvents.

According to one illustrative embodiment of the invention, MWNTs are mixed with an ionic liquid, such as 1-ethyl-3-methylimidazolium acetate. Other ionic liquids include, but are not limited to, 1-butyl-3-methylimidazolium chloride and 1-allyl-3-methylimidazolium chloride. Such mixing may be by mortar and pestle, for example, to form a homogenous gel. This core gel typically comprises between about 1% and about 10% MWNTs by weight, although lesser or greater MWNT concentrations may be used.

A sheath solution is prepared by dissolving cellulose in an ionic liquid, such as 1-ethyl-3-methylimidazolium acetate to a cellulose concentration of about 1.5% by weight, although concentrations between about 1% and about 5% by weight may also be used. The sheath solution may be mixed using a magnetic stirrer or similar device to form a homogeneous solution. Solution formation may be aided by heating to about 80° C.

Figure 1:
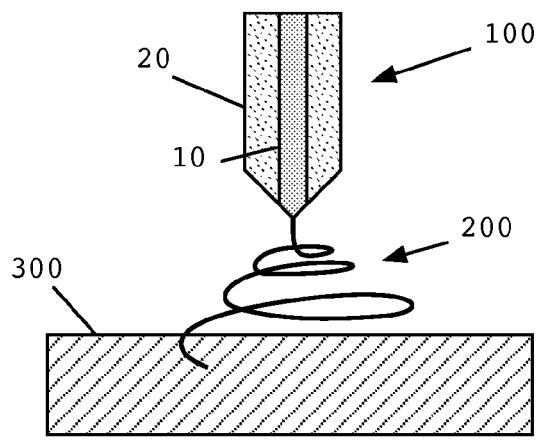
FIG. 1 shows a schematic view of the co-electrospinning of a carbon nanotube fiber gel core and a cellulose solution sheath to form a sheathed carbon nanotube fiber according to one embodiment of the invention.

The core gel and sheath solution are then co-electrospun using a co-axial spinneret, such as those available from MECC (Fukuoka, Japan). FIG. 1 shows such a co-axial spinneret 100 having an inner, core needle 10 and an outer, sheath needle 20. The inner, core needle 10 has a diameter less than that of the outer, sheath needle 20. In one embodiment, a diameter of the inner, core needle 10 is about 0.94 mm and a diameter of the outer, sheath needle 20 is about 2.50 mm. Needles having other absolute and relative diameters may be employed, however, the diameters given here being merely for the purpose of describing one embodiment of the invention.

Flow rates of the inner core gel and the outer sheath solution are, according to some embodiments of the invention, between about 280 μL/minute and about 320 μL/minute. At those flow rates, a voltage between about 18 kV and 22 kV applied to the spinneret typically achieves good electrospinnability of both the inner core gel and the outer sheath solution.

The co-axial electrospun fibers 200 are collected in a coagulation bath 300, which typically includes a liquid mixture capable of removing the ionic liquid. Suitable mixtures include, for example, a water/ethanol mixture. Once the ionic liquid is removed in the coagulation bath, the co-axial electrospun fibers 200 solidify to form a fiber mat. Upon removal from the coagulation bath 300, the fiber mat may then be washed with ethanol and dried under vacuum to remove residual water and ethanol.

Figure 2:
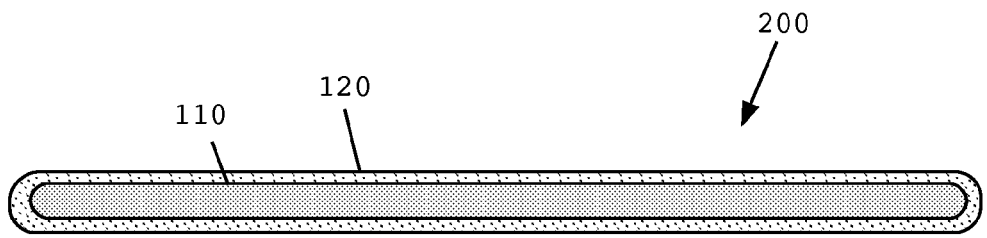
FIG. 2 shows a schematic cross-sectional view of a sheathed carbon nanotube fiber according to an embodiment of the invention.
Figure 3:
FIG. 3 shows the sheathed carbon nanotube fiber of FIG. 2 with portions of the carbon nanotube fiber core exposed.

FIG. 2 shows a schematic cross-sectional view of a co-axial electrospun fiber 200 according to an embodiment of the invention. As can be seen, co-axial electrospun fiber 200 includes a MWNT core 110 and a cellulose sheath 120. In FIG. 3, portions of the cellulose sheath 120 have been removed and portions 112, 114 of the MWNT core 110 exposed. The exposed portions 112, 114 of the MWNT core 110 may be used as electrical contacts. As shown in FIG. 3, portions 112, 114 of the length of the carbon nanotube fiber 200 is adjacent a second portion 120 of the length of the carbon nanotube fiber 200 along which the cellulose sheath does not extend.

Portions 112, 114 may be exposed using cellulase to digest areas of the cellulose sheath 120. In one embodiment, an aqueous cellulase solution may be applied to an absorbent material, such as hydrophilic poly(tetrafluoroethylene), which is then applied to an area of the cellulose sheath 120. The co-axial electrospun fiber 200 may then be washed to remove any digested cellulose and expose portions 112, 114 of the MWNT core 110.

Figure 4B:
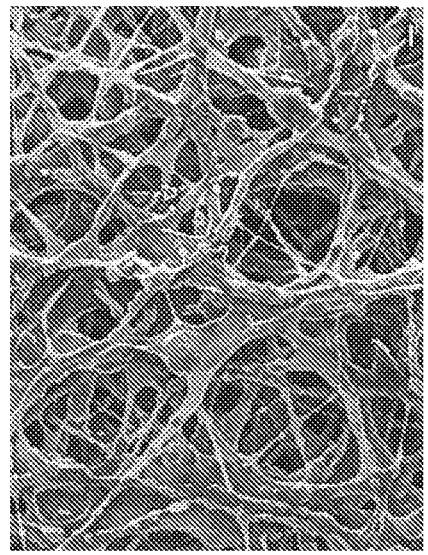
FIGS. 4A-4D show scanning electron micrographs of fiber mats at various loadings of multi-walled nanotubes, according to embodiments of the invention.
Figure 4D:
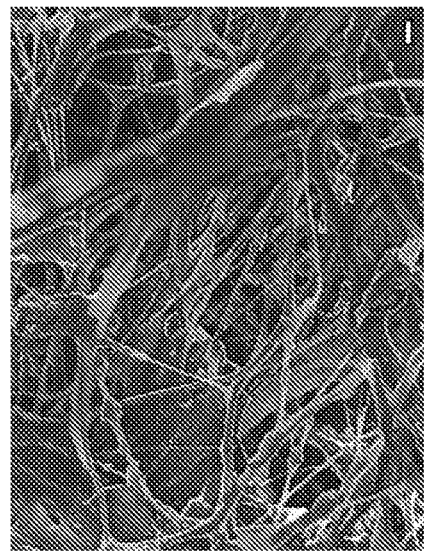
Figure 4A:
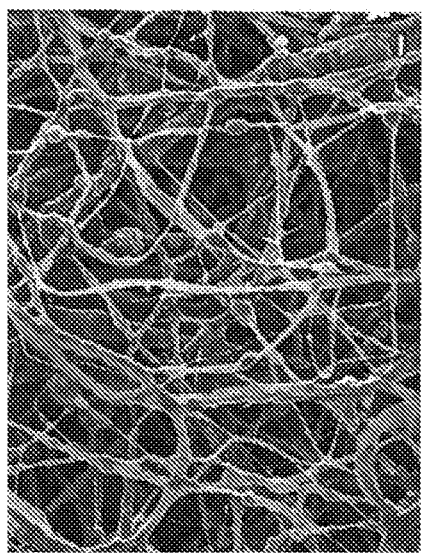
Figure 4C:
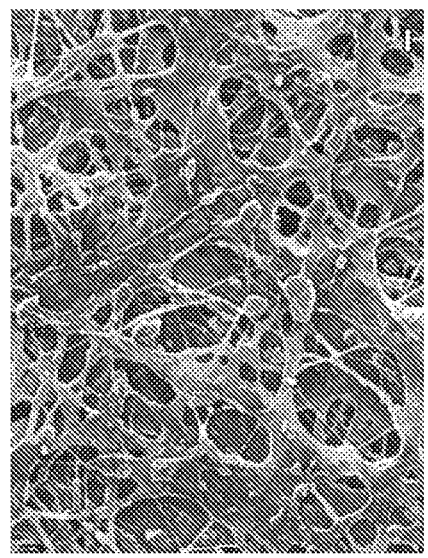

FIGS. 4A, 4B, 4C, and 4D show scanning electron micrographs of MWNT-cellulose fiber mats at various MWNT loadings. FIG. 4A shows a fiber mat at 45% MWNT, by weight. FIG. 4B shows a fiber mat at 40% MWNT, by weight. FIG. 4C shows a fiber mat at 30% MWNT, by weight. FIG. 4D shows a fiber mat at 20% MWNT, by weight.

Tensile Strength

The tensile strength of co-axial electrospun fiber mats according to embodiments of the invention are proportional to the cellulose:MWNT ratio of the fiber mats. A fiber mat of pure cellulose having dimensions of 15 mm×15 mm×50-80 μm was determined to have a tensile strength of 6.22 MPa. A co-axial electrospun fiber mat with a MWNT loading of 45% by weight exhibited a tensile strength of 2.54 MPa.

Tensile strength measurements were performed using Instron Materials Testing Machine (Norwood, Mass.) model 5543 equipped with a 10 N static load cell and hydraulic grips (Instron 2712-001). Specimens were tested at 0.25 mm/min tension speed with a 5 mm gauge length. Both load and grip-to-grip distance were measured. Tensile strength was calculated by dividing the peak load by the initial cross-sectional area of the sample.

Thermal Characteristics

Surprisingly, it was found that the temperature of the onset of cellulose degradation increased with an increasing MWNT load. It is possible that either the cellulose crystallinity of the co-axial electrospun fiber is increased by MWNT loading or that MWNTs act as a heat sink or an antioxidant, protecting the cellulose from thermal degradation.

In evaluating the thermal characteristics of fiber mats of the invention, thermogravimetric analysis was performed using a computer-controlled TA Instruments (New Castle, Del.) TGA Q50. Temperature was ramped up at 20° C. per minute up to 700° C. with the furnace open to allow air flow along with nitrogen purge gas.

Conductivity

Pristine fiber mats were found to be non-conductive, due to the substantially insulating effects of the cellulose sheath 120. Once portions 112, 114 (FIG. 3) of MWNT core 110 were exposed, however, the fiber mats were found to have conductive properties following Ohm's law. Where portions 112, 114 were separated by 1 cm, conductivity of the fiber mats was observed, confirming that MWNT core 110 was continuous for at least 1 cm.

Figure 5:
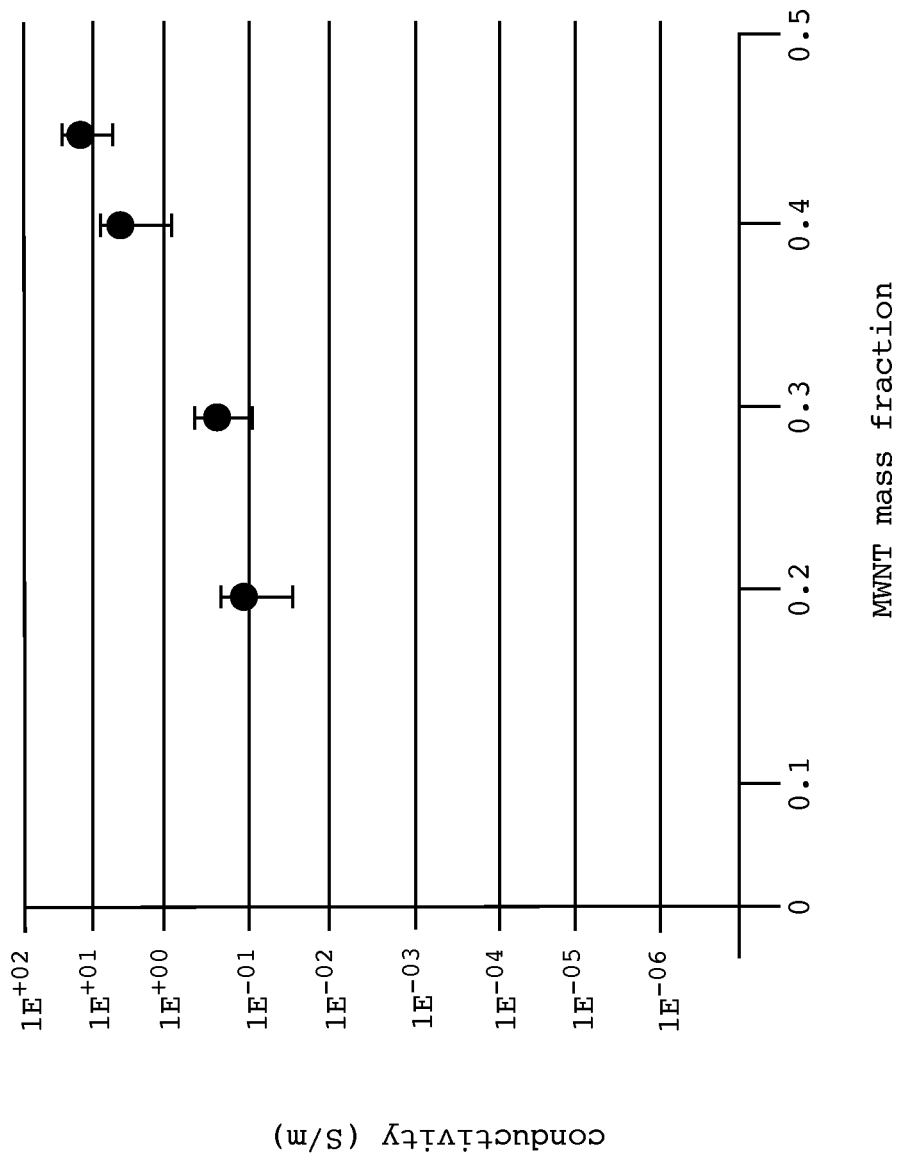
FIG. 5 shows a chart of the conductivities of fiber mats at various loadings of multi-walled nanotubes, according to embodiments of the invention.

In addition, it was found that the conductivities of the fibers increased with higher MWNT loading. In fact, a surprisingly large 2-order of magnitude increase in conductivity was obtained upon doubling the mass fraction of the MWNTs. This may suggest that the continuity of the MWNT core 110 improves at higher MWNT loading and/or that the MWNTs in the MWNT core 110 form denser wire- or cable-like core structures. FIG. 5 shows a graph of conductivities obtained at MWNT loadings of 20%, 30%, 40%, and 45%. At 45% MWNT loading, conductivities as high as 10.7 S/m were obtained.

All of these conductivities are significantly higher than those reported with carbon nanotube-polymer fiber mats, which are typically around $3.7 \times 10^{-2}$ S/m for poly(styrene)/single-wall nanotube fiber materials and $5.05 \times 10^{-6}$ S/m for poly(ethyleneterephthalate)/MWNT fiber materials. The higher conductivities obtainable according to embodiments of the present invention may be due, at least in part, to the fact that the MWNT-cellulose fibers here consist of pure MWNTs free of a polymer matrix, which permits formation of a dense MWNT core that more effectively conducts an electrical current.

Conductivities of co-axial electrospun fiber mats according to the invention were measured by preparing two "sheath-off" areas, 1 cm apart, on a fiber mat between 50 μm and about 80 μm thick. The sheath-off areas were sandwiched by 20 μm thick aluminum foil and clamped at 0.7 MPa. Characteristic I-V curves were obtained at room temperature using a two-probe method using a Princeton Applied Research (Oak Ridge, Tenn.) model 273A electropotentiostat, with an applied voltage up to 1 V at a scan rate of 100 mV/second. Electrical conductivities were calculated according to the following equation:

$$\sigma = L/(R \cdot A),$$

in which σ is electrical conductivity in Siemens per meter (S/m), L is the distance between sheath-off areas, R is resistance, and A is a cross-sectional area of the fiber mat.

The co-axial electrospun fibers according to some embodiments of the invention may be employed in any number of applications. For example, the cellulose sheath serves as an effective nanoscale insulating layer, permitting two parallel co-axial electrospun fibers to be used in electrical double-layer supercapacitor devices. In such a device, the distance between the two electrodes would be double the sheath thickness, often on the scale of hundreds of nanometers, permitting very high specific capacitances.

Other applications of the co-axial electrospun fibers according to embodiments of the invention include, for example, their use as the separator of a biomorph actuator, based on the formation of an electrical double layer. The thin, flexible separator achievable using the co-axial electrospun fibers of the invention may improve response properties of such an actuator.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A sheathed carbon nanotube fiber comprising:
a carbon nanotube fiber; and
a cellulose sheath extending co-axially along at least a first portion of a length of the carbon nanotube fiber, wherein the first portion of the length of the carbon nanotube fiber is adjacent a second portion of the length of the carbon nanotube fiber along which the cellulose sheath does not extend.

2. The sheathed carbon nanotube fiber of claim 1, wherein the carbon nanotube fiber includes a multi-walled nanotube fiber.

3. The sheathed carbon nanotube fiber of claim 1, wherein the carbon nanotube fiber comprises at least about 20% of the sheathed carbon nanotube fiber by weight.

4. The sheathed carbon nanotube fiber of claim 3, wherein the carbon nanotube fiber comprises at least about 30% of the sheathed carbon nanotube fiber by weight.

5. The sheathed carbon nanotube fiber of claim 4, wherein the carbon nanotube fiber comprises at least about 40% of the sheathed carbon nanotube fiber by weight.

6. The sheathed carbon nanotube fiber of claim 5, wherein the carbon nanotube fiber comprises at least about 45% of the sheathed carbon nanotube fiber by weight.

7. A fiber mat comprising the sheathed carbon nanotube fiber of claim 1, wherein the fiber mat comprising the carbon nanotube fiber has a conductivity between about $1.0\times10^{-1}$ S/m and about 10.7 S/m.

8. A fiber mat comprising the sheathed carbon nanotube fiber of claim 1, wherein the fiber mat comprising the carbon nanotube fiber has a conductivity between about 1.0 S/m and about 10.7 S/m.

9. A fiber mat comprising the sheathed carbon nanotube fiber of claim 1, wherein the fiber mat comprising the carbon nanotube fiber has a conductivity between about 10 S/m and about 10.7 S/m.

10. A mat of sheathed carbon nanotube fibers comprising:
   a plurality of carbon nanotube fibers; and
   a cellulose sheath extending co-axially along a first portion of a length of each of the carbon nanotube fibers and not extending onto a second portion of the length of each of the carbon nanotube fibers adjacent the first portion,
   wherein a tensile strength of the mat is between about 1.5 MPa and about 2.5 MPa.

11. The mat of claim 10, wherein the mat has a conductivity between about $1.0\times10^{-1}$ S/m and about 10.7 S/m.

12. The mat of claim 11, wherein the mat has a conductivity between about 1.0 S/m and about 10.7 S/m.

13. The mat of claim 12, wherein the mat has a conductivity between about 10 S/m and about 10.7 S/m.

* * * * *